United States Patent
Holzner et al.

(10) Patent No.: US 6,600,984 B1
(45) Date of Patent: Jul. 29, 2003

(54) METHOD FOR JUDGING THE SERIOUSNESS OF A MOTOR VEHICLE CRASH

(75) Inventors: Michael Holzner, Gaimersheim (DE); Andreas Kuhn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/856,698

(22) PCT Filed: Nov. 22, 1999

(86) PCT No.: PCT/EP99/08990

§ 371 (c)(1),
(2), (4) Date: Aug. 17, 2001

(87) PCT Pub. No.: WO00/30903

PCT Pub. Date: Jun. 2, 2000

(30) Foreign Application Priority Data

Nov. 25, 1998 (DE) .......................... 198 54 380

(51) Int. Cl.⁷ .................................. B60R 21/32
(52) U.S. Cl. ........................... 701/45
(58) Field of Search .......... 701/36, 40, 45–49, 701/57, 58–59, 70, 77; 180/282; 280/735

(56) References Cited

U.S. PATENT DOCUMENTS 5,282,134 A * 1/1994 Gioutsos et al. ............ 180/274
5,377,108 A   12/1994 Nishio
5,484,166 A    1/1996 Mazur et al.
5,583,771 A   12/1996 Lynch et al.
5,673,365 A *  9/1997 Basehore et al. ............ 180/282
5,684,701 A   11/1997 Breed
5,742,916 A *  4/1998 Bischoff et al. .............. 701/45
6,169,945 B1 * 1/2001 Bachmaier ................. 307/10.1

FOREIGN PATENT DOCUMENTS

| DE | 42 22 595 | 1/1993 |
| DE | 195 20 608 | 12/1996 |
| EP | 0 327 853 | 8/1989 |
| EP | 0 709 257 | 5/1996 |

* cited by examiner

*Primary Examiner*—Thu Nguyen
(74) *Attorney, Agent, or Firm*—Crowell & Moring LLP

(57) ABSTRACT

Like in a conventional crash detection algorithm, a crash is detected if a threshold value of an acceleration or an integrated acceleration is exceeded. Various characteristic values for characterizing the sensor signal paths are collected and supplied to the neural network. Said neural network returns the characteristic values for the seriousness of the crash, thereby facilitating the various retention systems to reaction individually. The invention provides a method for reliably, simply and quickly making statements regarding the seriousness and the course of a motor vehicle crash and for controlling occupant protection systems according to demand.

21 Claims, 1 Drawing Sheet

METHOD FOR JUDGING THE SERIOUSNESS OF A MOTOR VEHICLE CRASH

BACKGROUND AND SUMMARY OF THE INVENTION

The invention relates to a method of detecting the seriousness of a vehicle crash, in which the output signal of an acceleration sensor is processed and supplied to a neural network which controls a triggering unit for an occupant protection system.

Such a method is known from U.S. Pat. No. 5,583,771 A. In this case, the output signal of a single acceleration sensor is stored for a defined time period with respect to its path, and information, such as the amplitude, the course of the velocity, etc., is determined from the signal path. This information is fed as input information into the neural network which decides whether a single air bag is ignited.

The known method has a large number of disadvantages. On the one hand, it is necessary to store the path of the crash signal for a predefined time period and, naturally, only analyze it subsequently. The use of a single acceleration sensor does not permit judgment of all possible vehicle crashes with respect to their seriousness with sufficient certainty.

The cause is a normally existing directional dependence of acceleration sensors. If the acceleration sensor is capable, for example, of detecting a frontal crash, a side crash can, as a rule, not be detected or can at least not be detected with the same precision. Such a single acceleration sensor is, as a rule, arranged centrally in the vehicle. As a result of the vehicle structure, the deceleration at the site of the acceleration sensor takes place only in a delayed manner and its path is completely different from the path taking place, for example, at the impact site of an obstacle. As a rule, this results in considerable problems with respect to detecting the seriousness of the vehicle crash with sufficient precision. This sometimes results in the problem of not being able to detect the crash in sufficient time.

Since the neural network is naturally trained by means of preceding signal paths for different types of crashes, experience has shown that when looking at only a single sensor signal, no conclusion can be drawn on the further course of the vehicle crash if, as in U.S. Pat. No. 5,583,771, only the previous path of the sensor signal is analyzed. The known method is therefore only suitable to a limited extent. It supplies only rough outlines and furnishes useful criteria only for the decision on whether an occupant protection system should be triggered at all.

It is an object of the present invention to provide a method of the above-mentioned type which supplies significantly better information concerning a vehicle crash.

The invention meets these needs by providing a method of detecting the seriousness of a vehicle crash, in which the output signal of an acceleration sensor is processed and supplied to a neural network which controls a triggering unit for an occupant protection system. For detecting also the course of the vehicle crash, additional crash sensors are provided, which supply a physical value identical with or similar to the output signal of the acceleration sensor as input signals for the neural network. By means of the triggering unit, several occupant protection systems are controlled corresponding to the seriousness and the course of the vehicle crash.

Other objects, advantages and novel features of the present invention will become apparent from the following detailed description of the invention when considered in conjunction with the accompanying drawings.

DETAILED DESCRIPTION OF THE DRAWINGS

Figure 1:
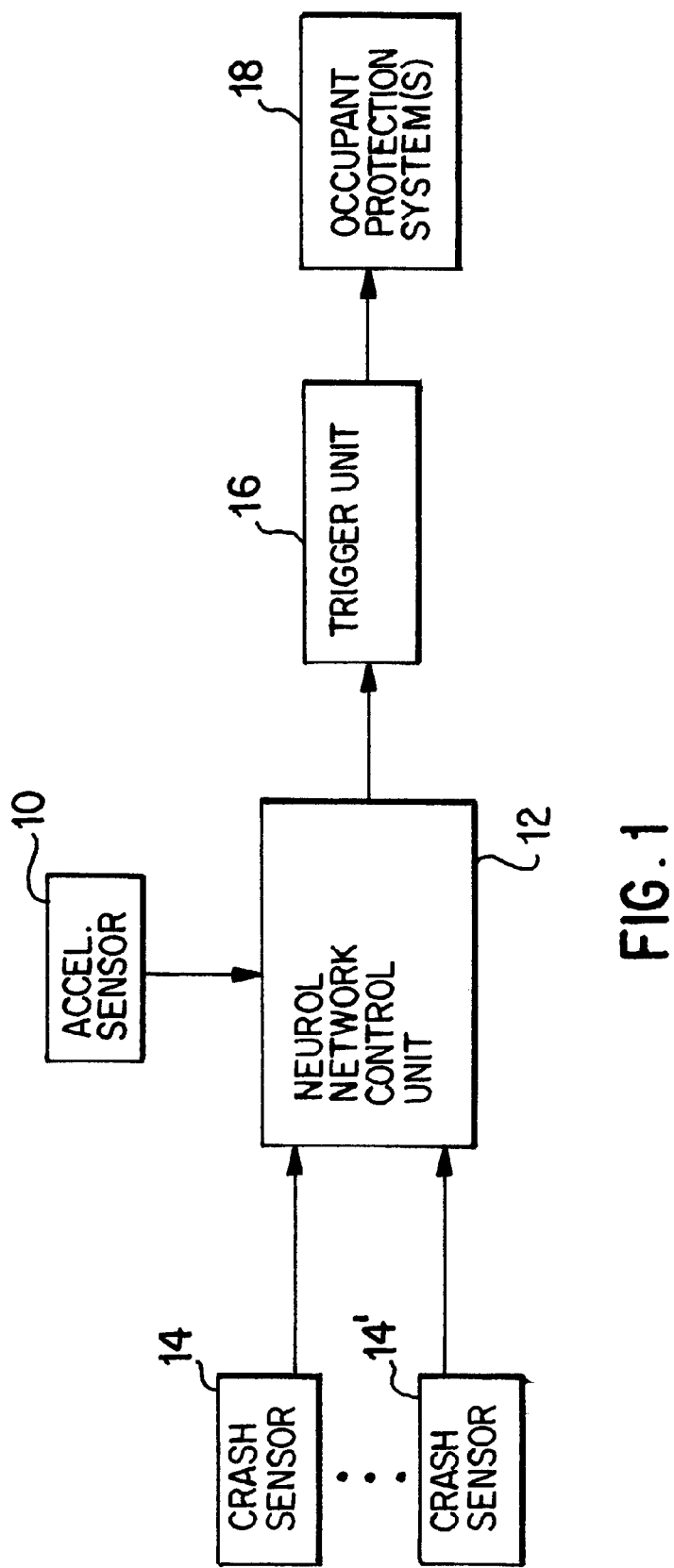
FIG. 1 is a schematic block diagram of the apparatus for performing the method according to the present invention.

Referring to the FIGURE, the present invention includes an acceleration sensor 10 supplying to an output signal to a neural network control unit 12. Also, additional crash sensors 14, 14' are provided that likewise supply an output signal to the neural network 12. The neural network control unit 12 is coupled to a trigger unit 16 which controls at least one occupant protection system 18.

The use of a plurality of crash sensors permits not only an arrangement of these sensors centrally, but also at the sites which are preferentially affected in the event of a vehicle crash. For a frontal crash, these sites are in the area of the forward structure, for example, on the engine mount; for a rear-end crash, these sites are in the area of the rearward structure. A side impact can preferably be detected by sensors which are arranged in the side area of the vehicle. Because of the large number of crash sensors, for example, a total of eight or more, information on not only the seriousness, of the crash, but also concerning the course of a vehicle crash can be obtained.

The decentralized crash sensors and the central acceleration sensor supply a physically equivalent output signal for the same point in time. This point in time is determined by a trigger signal which is emitted, for example, by one of the crash sensors or the acceleration sensor if its output signal exceeds a predefined threshold value. In the case of a vehicle crash, this will be the sensor which is closest to the impact site of an object. This sensor is the one most affected out of all the sensors and causes the other sensors to supply their respective output signals at one and the same point in time. This point in time can, for example, be selected to be 5 ms after the detection of a vehicle crash.

When applied to a large number of crash or acceleration sensors, the use of a neural network has the special advantage that it can still supply information on the seriousness and the course of a vehicle crash even if one or more sensors fail. By contrast, in the case of U.S. Pat. No. 5,583,771 A, the failure of the single sensor makes it impossible to supply any information at all concerning the vehicle crash.

The crash sensors supply a physical value having the same quality as the value supplied by the acceleration sensor. These values can also be acceleration values. In that case, the crash sensors would, for example, also be constructed in the same manner as the acceleration sensor and would operate according to the same physical principle.

A further improvement of the information on the seriousness and the course of a vehicle crash can be achieved by integrating the output signal of the crash sensors and of the acceleration sensor over time. The first integration will then result in information concerning the speed or the relative speed at the respective site of the sensor.

A clear improvement with respect to the informational value can be obtained when the output signals of the sensors are integrated twice over time. The result is information on the path covered by the sensor site. The processing of this information in the neural network takes place rapidly and, even after a brief course of the vehicle crash, results in extensive information on the further course of the crash. If the point in time at which information is gathered concerning the covered path is chosen, for example, again to be equal to 5 ms after the detection of the vehicle crash, sufficient information will be available after a few ms which, as required, permits the activation of different occupant protection devices or the preparation for the crash course to be expected with high probability. In addition to the number of occupant protection devices which are controlled, the intensity with which these devices are applied can also be defined by means of the neural network.

So far, only the case the input signals are fed at a defined point in time only once into the neural network has been considered. A further improvement of the reliability of the information of whether and to what extent occupant protection devices must be activated can be achieved. Here, the physical values formed from the output signals of the acceleration sensor and of the crash sensors are fed at successive defined points in time as input signals into the neuronal network. This is advantageous in two respects.

On the one hand, it can be checked whether the "prediction" concerning the further course of the crash, which was made by means of the preceding input signals, is correct. If necessary, a correction of the activating program of the occupant protection devices must take place.

On the other hand, influences can also be taken into account which are unusual and/or cannot be detected from the preceding input signals or cannot be detected sufficiently clearly. One example is the pole impact, where the obstacle is often detected late after it has penetrated far into the vehicle.

The neural network according to the invention is not constantly queried as in U.S. Pat. No. 5,583,771 A but, as in the case of a conventional crash detection algorithm, it is triggered first in the case of a crash, for example, by the fact that a filtered acceleration value exceeds a certain threshold. Subsequently, several characteristic values of the acceleration paths are transmitted by several sensors to the neural network as y-values (but not their entire time-related course). The characteristic values of the acceleration paths are obtained by means of time-window and/or time-related double integrals of the accelerations and/or diverse mathematical combinations of the different characteristic signal values. The number of required inputs into the neural network is therefore no longer several dozens to hundreds of inputs, but rather only a small number of inputs (less than 10).

The output signal of the neural network also does not lead to the direct controlling of the air bags (FIRE/NOFIRE) but consists of a parameter which describes the "seriousness of the crash" (for example, x=(impact position, impact velocity, . . . ). When reliable information concerning the seriousness of the crash cannot yet be obtained, the neural network can be triggered by way of another triggering threshold, which is raised with respect to the first triggering threshold, and can be queried again.

By determining the seriousness of a crash, a modularity of the algorithm is permitted so that several units (several air bags, belt tightening devices, etc.) can react in a manner which is adapted to the seriousness of the crash.

Because the neural network is called up only after being triggering and not constantly, and also because the operation takes place by means of much more highly processed data, the required expenditures can also be implemented using the computing capacity already existing in current conventional control units and processors. As a result of the greater processing of the signal data, results from crash simulations can also be used as example data for training purposes.

The foregoing disclosure has been set forth merely illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of detecting the severity of a vehicle crash, the method comprising the acts of:
   providing a neural network that controls a triggering unit for an occupant protection system in a motor vehicle;
   generating an output signal from an acceleration sensor in the event of the vehicle crash;
   generating from additional crash sensors respective output signals representing physical values identical with or similar to the output signal of the acceleration sensor;
   wherein one of the sensors causes the other of the sensors to supply their respective output signals to the neural network at a same point in time in response to a trigger signal generated by the one of the sensors when the output signal of the one of the sensors exceeds a predefined threshold value;
   determining a severity and a course of the vehicle crash by the neural network based on the output signals supplied to the neural network; and
   controlling a plurality of occupant protection systems, via the triggering unit, in accordance with the severity and the course of the vehicle crash determined by the neural network.

2. The method according to claim 1, wherein said additional crash sensors supply information concerning respective relative speeds at the respective sensor sites on the vehicle.

3. The method according to claim 2, wherein said additional crash sensors are acceleration sensors.

4. The method according claim 2, further comprising the act of integrating over time the output signals of the additional crash sensors and the acceleration sensor.

5. The method according to claim 2, further comprising the act of integrating twice over time the output signals of the additional crash sensors.

6. The method according to claim 2, further comprising the act of feeding at successive defined points in time the physical values formed from the output signals of the acceleration sensor and the additional crash sensors as input signals into the neural network.

7. The method according to claim 1, wherein the additional crash sensors supply information concerning respective relative displacements of the sites at which the sensors are arranged on the vehicle.

8. The method according to claim 7, wherein said additional crash sensors are acceleration sensors.

9. The method according claim 7, further comprising the act of integrating over time the output signals of the additional crash sensors and the acceleration sensor.

10. The method according to claim 7, further comprising the act of integrating twice over time the output signals of the additional crash sensors.

11. The method according to claim 7, further comprising the act of feeding at successive defined points in time the physical values formed from the output signals of the acceleration sensor and the additional crash sensors as input signals into the neural network.

12. The method according to claim 1, wherein said additional crash sensors are acceleration sensors.

13. The method according claim 12, further comprising the act of integrating over time the output signals of the additional crash sensors and the acceleration sensor.

14. The method according to claim 12, further comprising the act of integrating twice over time the output signals of the additional crash sensors.

15. The method according to claim 12, further comprising the act of feeding at successive defined points in time the physical values formed from the output signals of the acceleration sensor and the additional crash sensors as input signals into the neural network.

16. The method according claim 1, further comprising the act of integrating over time the output signals of the additional crash sensors and the acceleration sensor.

17. The method according to claim 16, further comprising the act of integrating twice over time the output signals of the additional crash sensors.

18. The method according to claim 16, further comprising the act of feeding at successive defined points in time the physical values formed from the output signals of the acceleration sensor and the additional crash sensors as input signals into the neural network.

19. The method according to claim 1, further comprising the act of integrating twice over time the output signals of the additional crash sensors.

20. The method according to claim 19, further comprising the act of feeding at successive defined points in time the physical values formed from the output signals of the acceleration sensor and the additional crash sensors as input signals into the neural network.

21. The method according to claim 1, further comprising the act of feeding at successive defined points in time the physical values formed from the output signals of the acceleration sensor and the additional crash sensors as input signals into the neural network.

* * * * *